Sept. 3, 1935.    E. H. ANDERSON    2,013,333
METHOD OF PRODUCING OIL SEALS
Filed March 17, 1933

Witness
Paul F. Bryant

Inventor
Ernest H. Anderson
by his attorneys
Fish Hildreth Cary & Jenney

Patented Sept. 3, 1935

2,013,333

UNITED STATES PATENT OFFICE 2,013,333

METHOD OF PRODUCING OIL SEALS

Ernest H. Anderson, Forestville, Conn., assignor to Graton & Knight Company, Worcester, Mass., a corporation of Massachusetts Application March 17, 1933, Serial No. 661,344

1 Claim. (Cl. 29—148)

The present invention relates to methods of producing oil seals, and more particularly to a method of forming a one-piece housing for articles of this character coincident with the assembly and clamping of certain additional portions of the unit therewith.

Generally speaking, I propose to form an outwardly cylindrical housing having assembled therewith a flexible leather sealing gasket and a sealing spring in engagement with the gasket. I accomplish this result by first drawing a cup of the proper external dimensions, with the bottom pierced to provide a radial flange partially closing the shell at this point. Thereafter a molded and shaped gasket of leather or the like having an outer clamping portion generally concentric with the wall of the shell and extending axially thereof is assembled together with a retaining spring. The cup drawn blank with the gasket and spring assembled therein is received in a mold cavity, and the upper and free edges of the cup drawn blank are curled inwardly and rearwardly to provide a circumferential space for enclosing the sealing end of the gasket, and rigidly clamping the outer sealing end of the gasket against the cylindrical wall of the housing. When completed, the gasket is rigidly secured within the housing, and the housing both as to diameter and depth is held within close tolerances. I have found it desirable under certain conditions intermediate the cup drawing and final assembly operations to provide a circumferential rib at the closed end of the cup to strengthen and reinforce the cup against the stresses imposed by the final curling operation.

Figure 1:
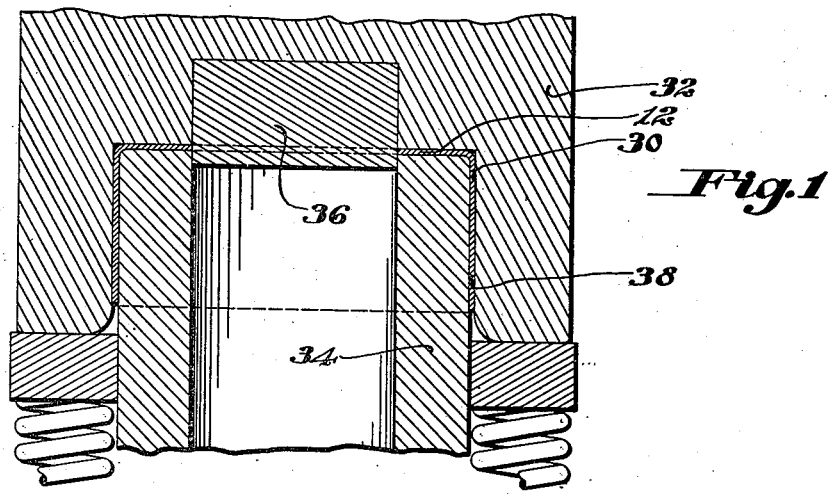
Figure 2:
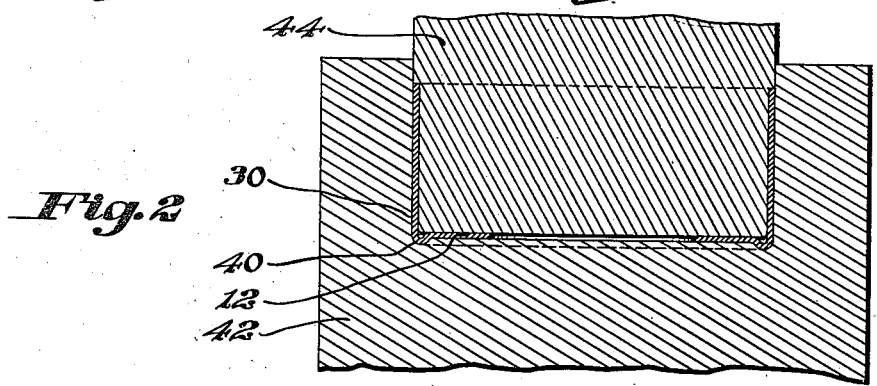
Figure 3:
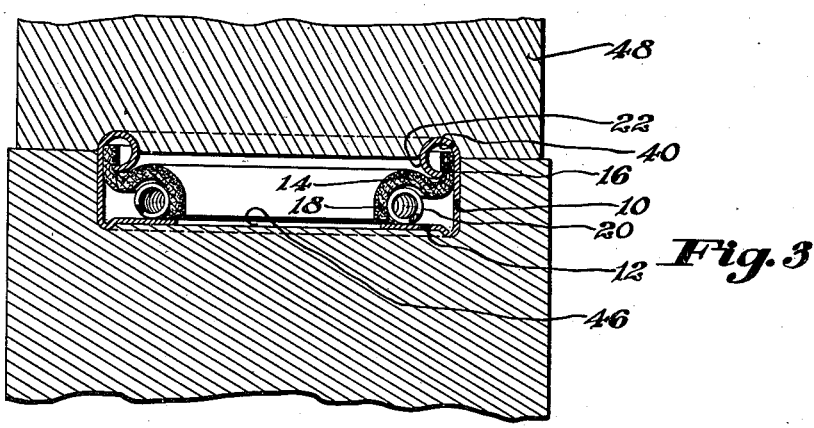

Referring particularly to the drawing, Fig. 1 represents a section in elevation of the dies which cooperate to draw the cup and pierce the closed end; Fig. 2 represents a second or succeeding operation, if performed, of ribbing the pierced and cup drawn blank; and Fig. 3 illustrates the operation of inwardly curling the open end of the cup drawn blank to clamp the flexible gasket and retaining spring therein.

As indicated particularly in the illustrated embodiment of the invention, the completed seal ring comprises generally a one-piece housing indicated at 10 and of generally cylindrical contour partially closed at one end by a radial flange 12. Enclosed within the housing is a flexible leather seal ring or gasket 14, having an outer clamping portion 16 extending axially within the cylindrical portion of the housing, and an inner sealing portion 18 also extending in an axial direction. Cooperating with the free or sealing end of the gasket is an endless coil spring 20. The outer end of the gasket is clamped rigidly to the housing by an inturned curled portion 22 formed on the free end of the housing.

This construction is produced according to my method by first forming a cupped blank 30 with end-forming dies 32 and 34, the bottom of the cup being pierced at the end of the forming stroke by a piercing die 36. The cup has the exact outer dimensions of the finished unit, and the wall 38 is of sufficient depth to provide material for the inward curling of the ends. Subsequently, if so desired, the cup drawn blank 30 is subjected to a following operation in which a circumferential bead 40 is formed at the region between the side walls and bottom flange to reinforce the blank for the succeeding operation. This may be performed by cooperating dies 42 and 44. Finally the cup drawn blank is assembled with the leather gasket 14 which has been properly cut and molded into the desired form, and is assembled within the cup, together with the coil spring 20. These members are received in the die cavity 46 and subjected to the pressure of a press member 48, having a circumferential groove 50 formed therein which engages the upper free end of the cup wall 38, and gradually turns this end inwardly and downwardly about a radius determined essentially by the radius of the groove. In other words, as the members move together, the upper end of the wall is turned about a short radius and curled into approximately the shape illustrated in Fig. 3. When the operation is completed, the inwardly curled end has clamped the leather gasket to the outer wall of the housing in the manner indicated, and the depth of the housing between the radial flange and the inwardly curled end is held to accurate dimensions. If the operation is properly carried out and the material held within the proper limits, the gasket may be securely clamped without cutting or injury, and the overall dimensions retained in exact conformity with whatever may be specified.

What is claimed is:

The method of making an oil seal which consists in forming a cylindrical cupped blank, assembling the cupped blank within a die cavity surrounding the blank and from which the free edge extends outwardly, locating within the blank a molded non-metallic sealing ring of circular form and having an outer portion of larger diameter engaging with the inner wall of the blank below the projecting edge and an inner portion of smaller diameter in proximity to the bottom of the cupped blank, and an endless coiled spring surrounding the smaller portion of the sealing ring and held in place by the blank, and permanently connecting the sealing ring at the portion of larger diameter to the cupped blank by curling the free edge of the cupped blank downwardly and rearwardly upon itself by direct pressure exerted through a plunger which engages with the free edge of the blank and directs it downwardly and rearwardly to rigidly clamp the sealing ring between the two portions of the wall of the blank.

ERNEST H. ANDERSON.